United States Patent [19]

Kobayashi et al.

[11] 4,326,412
[45] Apr. 27, 1982

[54] FLOWMETER OF HOT WIRE TYPE

[75] Inventors: Hiroshi Kobayashi, Yokosuka; Toru Kita, Yokohama; Takeshi Fujishiro, Yokosuka, all of Japan

[73] Assignee: Nissan Motor Company, Limited, Yokohama, Japan

[21] Appl. No.: 62,528

[22] Filed: Jul. 31, 1979

[30] Foreign Application Priority Data

Aug. 5, 1978 [JP] Japan .................................. 53-95020
Nov. 14, 1978 [JP] Japan .......................... 53-155741[U]

[51] Int. Cl.³ .............................................. G01F 1/68
[52] U.S. Cl. ...................................... 73/204; 338/25; 338/267
[58] Field of Search .................... 73/204; 338/25, 267, 338/282, 286, 296

[56] References Cited

U.S. PATENT DOCUMENTS

| | | | |
|---|---|---|---|
| 2,319,516 | 5/1943 | Phelps | 73/204 |
| 2,412,471 | 12/1946 | Olson | 73/204 |
| 2,650,496 | 9/1953 | Middleton | 73/204 |
| 2,981,104 | 4/1961 | Auger et al. | 73/204 |
| 3,251,225 | 5/1966 | Luft | 73/204 |
| 3,971,247 | 7/1976 | Rodder | 73/204 |

FOREIGN PATENT DOCUMENTS

| | | | |
|---|---|---|---|
| 56854 | 10/1952 | France . | |
| 1905999 | 9/1970 | Fed. Rep. of Germany | 73/204 |
| 533226 | 2/1941 | United Kingdom . | |
| 1086742 | 10/1967 | United Kingdom | 73/204 |

*Primary Examiner*—Herbert Goldstein
*Attorney, Agent, or Firm*—Schwartz, Jeffery, Schwaab, Mack, Blumenthal & Koch

[57] ABSTRACT

The flow rate is determined from the heat transferred from an electrically heated wire stretched in a fluid flow to the fluid. The wire is placed not on a plane normal to the flow but within a section of the fluid passage bounded by two spaced planes normal to the flow. Preferably the wire is composed of series of line segments which are distributed evenly not only around the central axis of the passage but also in the direction of the flow so that the heat release from the wire in its entirety corresponds to the mean value of fluid velocities at various points.

9 Claims, 16 Drawing Figures

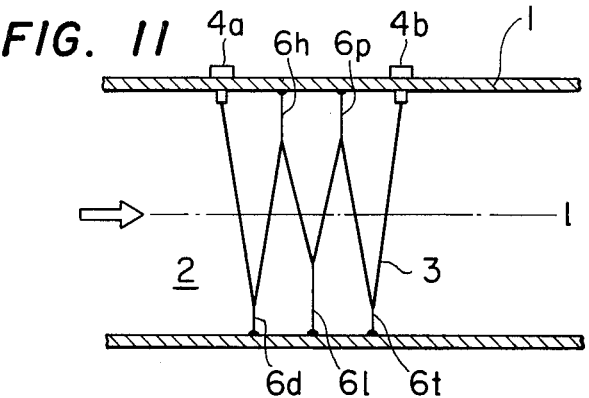
FIG. 11
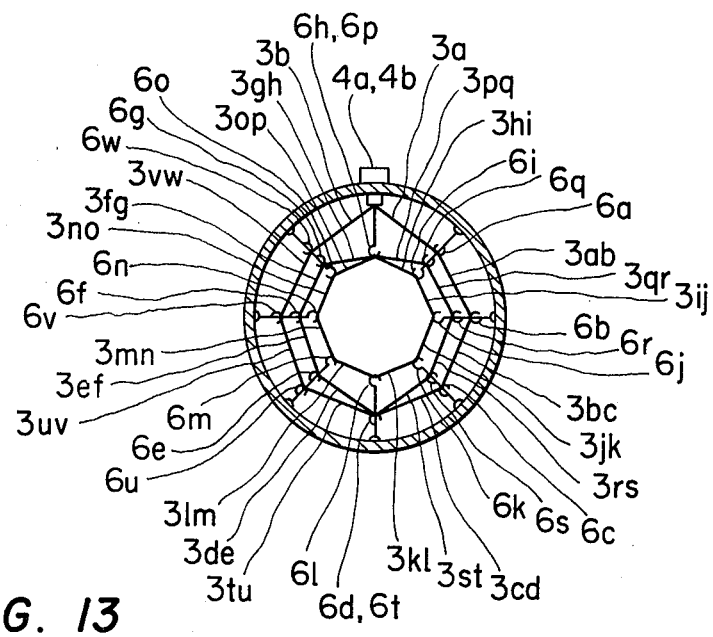
FIG. 12
FIG. 13
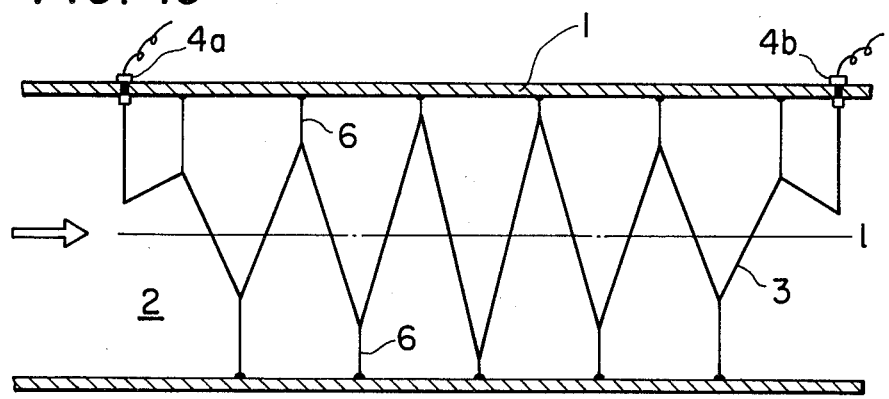

FLOWMETER OF HOT WIRE TYPE

BACKGROUND OF THE INVENTION

This invention relates to improvements in a flowmeter of a hot wire type in which the fluid flow rate is determined by the measurement of heat transferred from an electrically heated wire placed in the fluid flow to the fluid.

In the accompanying drawings, FIGS. 1 and 2 show the conventional flowmeter of this type in which a hot wire is placed on a plane normal to the direction of the flow. In FIGS. 1 and 2, a wire 3 in a I shape or an inverted V shape is placed on a plane normal to the flow in a fluid passage 2 of a pipe 1 and both ends of the wire 3 are connected to terminals 4a and 4b, respectively. Reference numeral 5 is a means for supplying an electric current to the wire 3 and measuring electrically the temperature drop of the wire.

When the thus arranged wire 3 is heated by passing an electric current through it and exposed to the fluid flow, the hot wire 3 is cooled by the flow and consequently the electric resistance of the wire 3 decreases. Since the heat release from the wire 3 to the fluid, which is known from the temperature drop of the wire 3, is proportional to the flow rate, the flow rate can be determined by the measurement of the resistance change of the wire or the voltage change between the terminals.

Such a conventional flowmeter of a hot wire type is useful for a fluid flow in a steady state, but not for a flow in which either the fluid velocity varies along the direction of the flow, as shown in FIG. 3 of the accompanying drawings, for example, an air flow in an intake manifold of an automobile engine equipped with an electronic fuel injection control system, or the fluid velocity varies with time as a pulsating flow as shown in FIG. 4 of the accompanying drawings. When a flow has such a spatial and/or temporal distribution of the velocity, the actual value of the flow rate can not be obtained because the heat release from the hot wire placed on a plane normal to the flow does not always correspond to the mean value of the velocities at various cross sections of the fluid passage, but corresponds only to the velocity at one cross section.

SUMMARY OF THE INVENTION

It is an object of the present invention to provide an improved flowmeter of a hot wire type by which the actual flow rate can be obtained especially in the case of a flow having a spatial and/or temporal fluid velocity distribution.

According to the present invention, the wire is stretched within a section of the fluid passage bounded by two spaced planes normal to the direction of the flow such that the wire intersects both of the planes. Preferably the wire is composed of a series of line segments which are distributed evenly not only around the central axis of the fluid passage but also in the direction of the flow so that the heat release from the wire in its entirety corresponds to the mean value of the fluid velocities at various points.

BRIEF DESCRIPTION OF THE DRAWINGS

FIG. 11 is a longitudinal section of a circular pipe showing still another embodiment of the present invention, FIG. 12 is a cross section of the pipe of FIG. 11, FIG. 13 is a longitudinal section of a circular pipe showing a modification of the embodiment shown in FIGS. 11 and 12.

DESCRIPTION OF THE PREFERRED EMBODIMENTS

Figure 1:
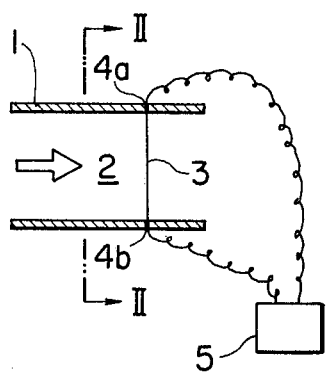
FIG. 1 is a longitudinal section of a circular pipe showing conventional arrangement of a hot wire.
Figure 2:
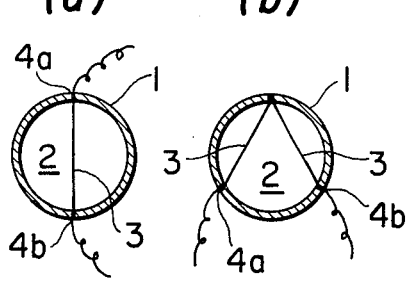
FIGS. 2(a) and 2(b) are cross sections taken along the line II—II of FIG. 1, showing two different conventional arrangements of a hot wire.
Figure 3:
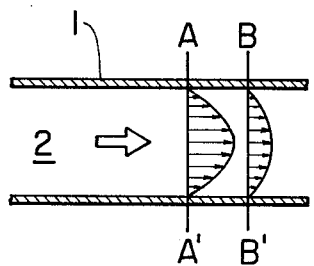
FIG. 3 shows fluid velocity distribution profiles varying along the direction of the flow.
Figure 4:
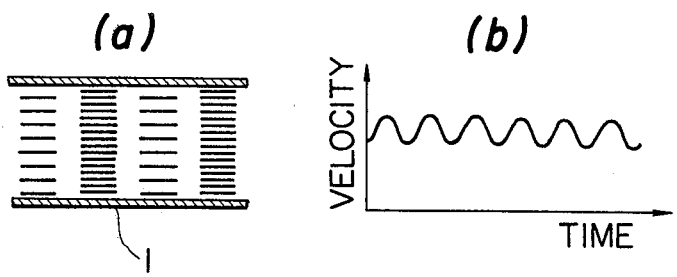
FIG. 4(a) is a schematic illustration showing a fluid density distribution in a pulsating flow and FIG. 4(b) is a velocity vs. time diagram of the pulsating flow of FIG. 4(a)
Figure 5:
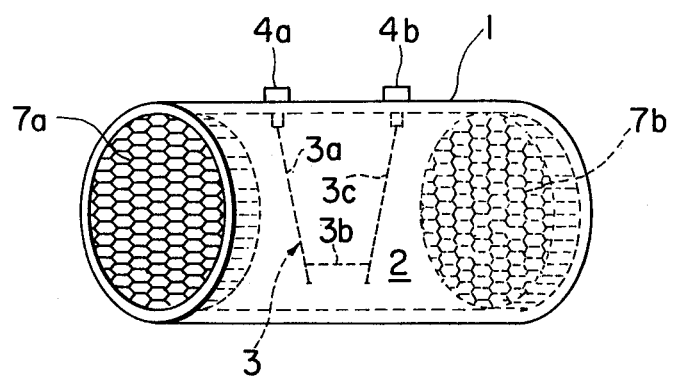
FIG. 5 is a perspective view of a circular pipe showing an arrangement of a hot wire according to the present invention.
Figure 6:
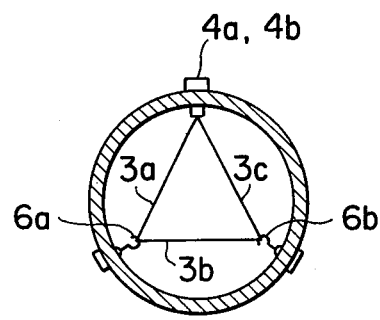
FIG. 6 is a cross section of the pipe of FIG. 5.
Figure 7:
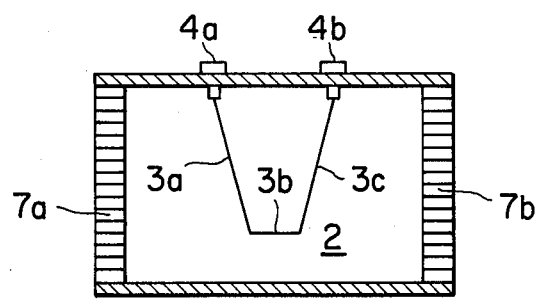
FIG. 7 is a longitudinal section of the pipe of FIG. 5.

In an embodiment shown in FIGS. 5-7, a wire 3 of a small diameter is composed of three straight line segments. From a terminal 4a on the top of a pipe 1 placed horizontally, the wire 3 is stretched downwardly and backwardly to a hook 6a holding the wire 3 to provide the first segment 3a of the wire 3. From the hook 6a, the second segment 3b extends horizontally and backwardly to another hook 6b, and the third segment 3c extends upwardly and backwardly from the hook 6b to a terminal 4b on the top of the pipe 1. Thus the path of wire is as follows:

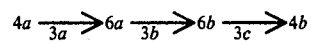

Reference numerals 7a and 7b indicate fluid flow unforming members.

Figure 8:
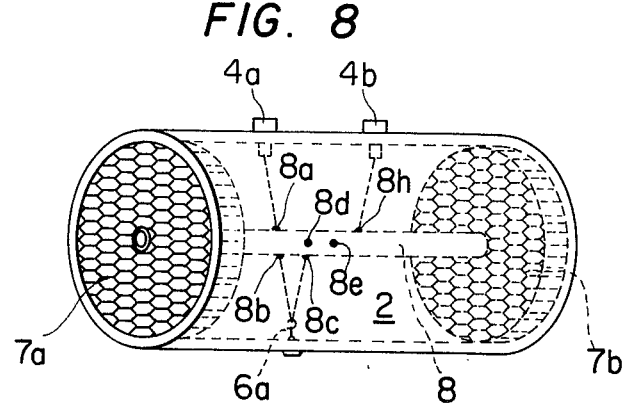
FIG. 8 is a perspective view of a circular pipe showing another embodiment of the present invention.
Figure 9A:
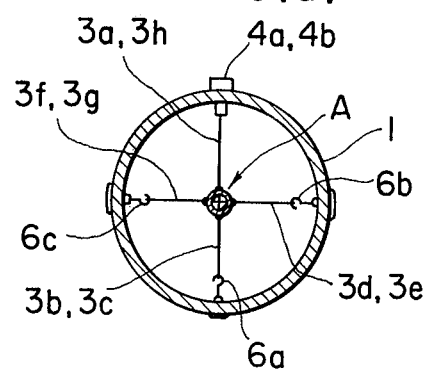
FIG. 9(a) is a cross section of the pipe of FIG. 8
Figure 9B:
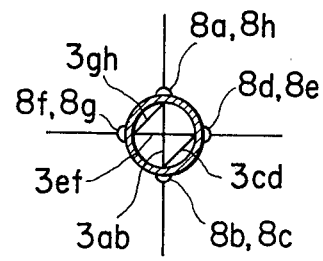
FIG. 9(b) is an enlarged detail of a portion A of FIG. 9(a)
Figure 10:
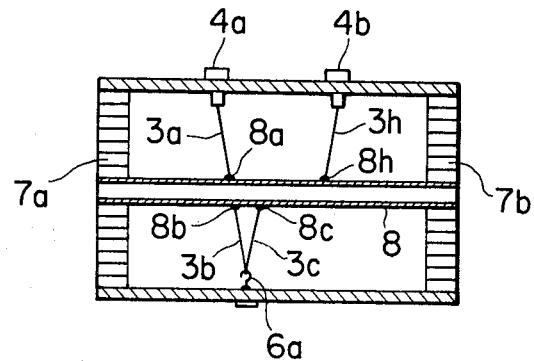
FIG. 10 is a longitudinal section of the pipe of FIG. 8.

FIGS. 8-10 show another embodiment of the present invention in which a support 8 of a tube having a small diameter is placed longitudinally in the center of the pipe 1 to support the wire 3. From a terminal 4a on the top of the pipe 1, the wire 3 extends downwardly and backwardly to a point 8a on the top of the support 8 (segment 3a of the wire 3). From the point 8a to a point 8b on the bottom of the support 8, the wire 3 passes through the support 8 substantially diametrically and extends to a hook 6a on the bottom of the pipe 1 (segment 3b). At the hook 6a the wire 3 turns upward, extends to a point 8c on the bottom of the support (segment 3c) and passes through the support 8 from the point 8c to a point 8d on the side of the support 8. From the point 8d the wire 3 runs horizontally in zigzag to a point 8g on the side of the support 8 by way of a hook 6b on the side of the pipe 1, points 8e and 8f on opposite sides of the support 8 and a hook 6c on the side of the pipe 1 (segments 3d, 3e, 3f and 3g). After passing through the support 8 from the point 8g to a point 8h on the top of the support 8, the wire 3 extends upwardly and backwardly to a terminal 4b on the top of the pipe 1 (segment 3h). Thus the path of wire is as follows:

$$4a \xrightarrow{3a} 8a \xrightarrow{3ab} 8b \xrightarrow{3b} 6a \xrightarrow{3c} 8c \xrightarrow{3cd}$$
$$8d \xrightarrow{3d} 6b \xrightarrow{3e} 8e \xrightarrow{3ef} 8f \xrightarrow{3f} 6c \xrightarrow{3g}$$
$$8g \xrightarrow{3gh} 8h \xrightarrow{3h} 4b$$

In the first embodiment shown in FIGS. 5–7 and the second embodiment shown in FIGS. 8–10, a wire is in a shape of a broken line composed of a series of line segments having substantially the same length and the same angle with a plane normal to the flow and lying successively downstream so that the segments of the wire are distributed evenly in the direction of the flow. Furthermore, the wire is arranged symmetrically around the central axis of the pipe in a plan view normal to the direction of the flow.

FIGS. 11 and 12 show still another embodiment in which the line segments of the wire are distributed more evenly over a cross section of the fluid passage. Referring to FIG. 11, the wire 3 is wound helically around the central axis l of the pipe 1, held by hooks 6a–6w (not all are shown in FIG. 11) and the lengths of shanks of the hooks 6a–6w are varied consecutively such that the wire 3 is in an hourglass shape. Referring to FIG. 12, the wire 3 begins at a terminal 4a on the top of the pipe 1, runs in a clockwise spiral via the hooks 6a–6w arranged radially on the periphery of the pipe 1 and terminates at a terminal 4b on the top of the pipe 1. Thus the path of wire is as follows:

$$4a \xrightarrow{3a} 6a \xrightarrow{3ab} 6b \xrightarrow{3bc} 6c \xrightarrow{3cd} 6d \xrightarrow{3de}$$
$$6e \xrightarrow{3ef} 6f \xrightarrow{3fg} 6g \xrightarrow{3gh} 6h \xrightarrow{3hi} 6i \xrightarrow{3ij}$$
$$6j \xrightarrow{3jk} 6k \xrightarrow{3kl} 6l \xrightarrow{3lm} 6m \xrightarrow{3mn} 6n \xrightarrow{3no}$$
$$6o \xrightarrow{3op} 6p \xrightarrow{3pq} 6q \xrightarrow{3qr} 6r \xrightarrow{3rs} 6s \xrightarrow{3st}$$
$$6t \xrightarrow{3tu} 6u \xrightarrow{3uv} 6v \xrightarrow{3vw} 6w \xrightarrow{3b} 4b$$

FIG. 13 shows a modification of the embodiment shown in FIGS. 11 and 12. The wire 3 is in a barrel shape as shown in FIG. 13 and the cross sectional view (not shown) is almost the same as FIG. 12. In other respects this modification is the same as the embodiment shown in FIGS. 11 and 12.

In the embodiments shown in FIGS. 11–13, the wire 3 is arranged like a cobweb in a plan view normal to the direction of the flow, as shown in FIG. 12, so that the line segments of the wire 3 are distributed more evenly over a cross section of the fluid passage. Furthermore, since the line segments of the wire have substantially the same angle with a plane normal to the flow, the wire 3 is extended successively downstream at almost constant rate, so that the segments of the wire are distributed evenly in the direction of the flow.

In each embodiment described above, the wire 3 is heated by supplying an electric current to it and exposed to a fluid flow. The flow rate can be obtained by the measurement of the temperature drop of the wire 3 caused by the flow which is determined from the electric resistance change of the wire 3 or the voltage change between the terminals.

According to the present invention, the wire is stretched not on a plane normal to the flow but within a definite three dimensional region in the pipe bounded by two cross sections and the wall of the pipe. Therefore, while the conventional flowmeter of a hot wire type in which the wire is placed only on a plane normal to the flow indicates a value corresponding to a fluid velocity at one cross section where the wire is placed, the flowmeter of the present invention indicates a value corresponding to fluid velocities at various cross sections within the definite space region.

Furthermore, in each embodiment described above, the wire is arranged symmetrically around the central axis of the pipe when viewed in the direction of the flow and the wire is extended successively downstream at an almost constant rate. Accordingly the flowmeters of these embodiments indicate directly the mean value of the flow rate even in the case of a flow having a spatial and/or temporal velocity distribution.

Preferably the wire is arranged like a cobweb when viewed in the direction of the flow such that the segments of the wire are distributed uniformly and generally symmetrically around the central axis of the pipe. Accordingly the approximate value of the actual flow rate can be easily obtained even in the case of a flow having an intricate velocity distribution.

What is claimed is:

1. A flowmeter of a hot wire type for a measurement of flow rate of fluid flowing through a fluid passage, the flowmeter comprising:
   an electrically heatable wire stretched within a section of the fluid passage bounded by two spaced planes normal to the direction of the fluid flow;
   means for electrically measuring the temperature drop of the wire caused by the fluid flow in the fluid passage;
   said wire being wound around the central axis of said fluid passage like a helix traced on a side surface of a barrel shape in such a manner that the heat release from said wire in its entirety approximates the mean fluid velocity averaged within said section of said fluid passage.

2. A flowmeter of a hot wire type for a measurement of flow rate of fluid flowing through a fluid passage, the flowmeter comprising:
   an electrically heatable wire stretched in three dimensions within a section of the fluid passage bounded by two spaced planes normal to the direction of the fluid flow in such a manner that the heat release from said wire in its entirety approximates the mean fluid velocity averaged within said section of said fluid passage;
   means for electrically measuring the temperature drop of the wire caused by the fluid flow in the fluid passage;
   wherein said wire is arranged to be generally symmetrical around the central axis of said fluid passage in a plan view normal to the direction of the flow, and wherein said wire is distributed, in a plan view normal to the direction of the flow, both inside and outside a circle having a center lying on the central axis of said fluid passage and dividing a cross sectional area of said fluid passage into two equal areas.

3. A flowmeter claimed in claim 2, wherein said wire is composed of a series of line segments lying end to end at an angle with each adjacent segment.

4. A flowmeter claimed in claim 3, wherein said segments have substantially the same angle with a plane normal to the direction of the flow and lie successively downstream.

5. A flowmeter claimed in claim 4, wherein said wire is arranged substantially in a form of a regular triangle inscribed in the circumference of said fluid passage in a plan view normal to the direction of the flow.

6. A flowmeter claimed in claim 4, wherein said wire is arranged to be substantially in a form of a cross whose intersecting point lies on the central axis of said fluid passage and whose end points lie on the circumference of said fluid passage, in a plan view normal to the direction of the flow.

7. A flowmeter claimed in claim 3, wherein said wire is wound helically around the central axis of said fluid passage like a cobweb in a plan view normal to the direction of the flow.

8. A flowmeter claimed in claim 7, wherein said segments have substantially the same angle with a plane normal to the direction of the flow.

9. A flowmeter of a hot wire type for a measurement of flow rate of fluid flowing through a fluid passage, the flowmeter comprising:

an electrically heatable wire stretched within a section of the fluid passage bounded by two spaced planes normal to the direction of the fluid flow;

means for electrically measuring the temperature drop of the wire caused by the fluid flow in the fluid passage; and said wire being wound around the central axis of said fluid passage like a helix traced on a side surface of an hourglass shape in such a manner that the heat release from said wire in its entirety approximates the mean fluid velocity averaged within said section of said fluid passage.

* * * * *